(12) United States Patent
McCune

(10) Patent No.: US 10,077,830 B2
(45) Date of Patent: Sep. 18, 2018

(54) TRANSFER BEARING FOR GEARED TURBOFAN

(71) Applicant: UNITED TECHNOLOGIES CORPORATION, Farmington, CT (US)

(72) Inventor: Michael E. McCune, Colchester, CT (US)

(73) Assignee: United Technologies Corporation, Farmington, CT (US)

( * ) Notice: Subject to any disclaimer, the term of this patent is extended or adjusted under 35 U.S.C. 154(b) by 37 days.

(21) Appl. No.: 15/039,896

(22) PCT Filed: Nov. 18, 2014

(86) PCT No.: PCT/US2014/066083
§ 371 (c)(1),
(2) Date: May 27, 2016

(87) PCT Pub. No.: WO2015/094539
PCT Pub. Date: Jun. 25, 2015

(65) Prior Publication Data
US 2017/0023123 A1    Jan. 26, 2017

Related U.S. Application Data

(60) Provisional application No. 61/916,339, filed on Dec. 16, 2013.

(51) Int. Cl.
*F16H 57/04* (2010.01)
*F01D 25/18* (2006.01)
(Continued)

(52) U.S. Cl.
CPC ......... *F16H 57/0479* (2013.01); *F01D 25/16* (2013.01); *F01D 25/183* (2013.01);
(Continued)

(58) Field of Classification Search
None
See application file for complete search history.

(56) References Cited

U.S. PATENT DOCUMENTS

2001/0047651 A1    12/2001    Fukutani
2004/0179935 A1     9/2004    Maguire
(Continued)

FOREIGN PATENT DOCUMENTS

JP    2011080400 A    4/2011

OTHER PUBLICATIONS

International Search Report and Written Opinion for PCT Application No. PCT/US2014/066083, dated Mar. 18, 2015.
(Continued)

*Primary Examiner* — Jacob S Scott
*Assistant Examiner* — Timothy Hannon
(74) *Attorney, Agent, or Firm* — Carlson, Gaskey & Olds, P.C.

(57) ABSTRACT

A gear reduction for a gas turbine engine comprises a carrier driven to rotate gears. The gears are supported by journal bearings. The carrier extends through a transfer bearing, which provides oil to passages within the carrier to supply oil to the gears and to the journal bearings. A device limits leakage oil from the transfer bearing to axial ends of the transfer bearing to a controlled amount. A gas turbine engine is also disclosed.

15 Claims, 3 Drawing Sheets

(51) Int. Cl.
*F02C 7/06* (2006.01)
*F01D 25/16* (2006.01)
*F02C 7/36* (2006.01)

(52) U.S. Cl.
CPC .............. *F01D 25/186* (2013.01); *F02C 7/06* (2013.01); *F02C 7/36* (2013.01); *F16H 57/043* (2013.01); *F16H 57/0486* (2013.01); *F05D 2260/40311* (2013.01); *F05D 2260/98* (2013.01)

(56) References Cited

U.S. PATENT DOCUMENTS

| | | | |
|---|---|---|---|
| 2006/0090449 A1 | 5/2006 | Moniz et al. | |
| 2006/0223664 A1* | 10/2006 | Duong | F16H 57/042 475/159 |
| 2008/0080969 A1* | 4/2008 | Legare | F01D 25/183 415/170.1 |
| 2012/0011824 A1* | 1/2012 | Cigal | F01D 9/065 60/39.08 |
| 2012/0192570 A1 | 8/2012 | McCune et al. | |
| 2013/0069313 A1* | 3/2013 | Sonokawa | F01D 11/003 277/300 |
| 2013/0192239 A1 | 8/2013 | Glahn et al. | |
| 2013/0283757 A1 | 10/2013 | Bordne et al. | |

OTHER PUBLICATIONS

International Preliminary Report on Patentability for International Application No. PCT/US2014/066083 dated Jun. 30, 2016.
Supplementary European Search Report for European Application No. 14872697.9 dated Dec. 14, 2016.

* cited by examiner

TRANSFER BEARING FOR GEARED TURBOFAN

CROSS-REFERENCE TO RELATED APPLICATION

This application claims priority to U.S. Provisional Patent Application No. 61/916,339, filed Dec. 16, 2013.

BACKGROUND OF THE INVENTION

This application relates to a transfer bearing for a gear reduction in a geared turbofan, wherein the oil leakage at axial ends of the bearing is controlled.

Gas turbine engines are known and include a fan delivering air into a bypass duct as propulsion air and into a core engine, where it flows to a compressor. The air is compressed in the compressor and passes downstream into a combustor section where it is mixed with fuel and ignited. Products of this combustion pass downstream over turbine rotors driving them to rotate. The turbine rotors, in turn, drive the compressor and fan rotors.

Historically, a turbine rotor drove the fan rotor at a single speed. More recently, it has been proposed to include a gear reduction between a fan drive turbine and the fan rotor.

The gear reductions require adequate lubrication. In one gear reduction, a fan drive shaft is driven by a rotating carrier in a planetary gear system. A transfer bearing provides oil to the carrier.

The transfer bearing supplies oil through a plurality of passages in the carrier, such that oil is supplied to gears and journal bearings within the gear reduction.

SUMMARY OF THE INVENTION

In a featured embodiment, a gear reduction for a gas turbine engine comprises a carrier driven to rotate gears. The gears are supported by journal bearings. The carrier extends through a transfer bearing, which provides oil to passages within the carrier to supply oil to the gears and to the journal bearings. A device limits leakage oil from the transfer bearing to axial ends of the transfer bearing to a controlled amount.

In another embodiment according to the previous embodiment, the device to limit leakage oil includes a supply of pressurized air to the ends.

In another embodiment according to any of the previous embodiments, the device to limit leakage oil includes a labyrinth seal at each axial end of the transfer bearing, with the pressurized air supplied on an opposed side of the labyrinth seal from the axial ends.

In another embodiment according to any of the previous embodiments, the transfer bearing is static.

In another embodiment according to any of the previous embodiments, the device to limit leakage oil also includes piston ring seals.

In another embodiment according to any of the previous embodiments, the device to limit leakage oil also includes a carbon gap seal providing a controlled leakage gap between an inner periphery of the carbon gap seal and an outer periphery of the carrier.

In another embodiment according to any of the previous embodiments, the device to limit leakage includes piston ring seals.

In another embodiment according to any of the previous embodiments, the device to limit leakage includes a carbon gap seal providing a controlled leakage gap between an inner periphery of the carbon gap seal and an outer periphery of the carrier.

In another embodiment according to any of the previous embodiments, the transfer bearing is static.

In another embodiment according to any of the previous embodiments, the gears are planet gears.

In another featured embodiment, a gas turbine engine comprises a fan drive turbine driving a fan rotor through a gear reduction. The gear reduction includes a carrier driven to rotate gears. The gears are supported by journal bearings. The carrier extends through a transfer bearing, which provides oil to passages within the carrier to supply oil to the gears and to the journal bearings. A device limits leakage oil from the transfer bearing to axial ends of the transfer bearing to a controlled amount.

In another embodiment according to the previous embodiment, the device to limit leakage oil includes a supply of pressurized air to the ends.

In another embodiment according to any of the previous embodiments, the device to limit leakage oil includes a labyrinth seal at each axial end of the transfer bearing.

In another embodiment according to any of the previous embodiments, the transfer bearing is static.

In another embodiment according to any of the previous embodiments, the device to limit leakage oil also includes piston ring seals.

In another embodiment according to any of the previous embodiments, the device to limit leakage oil also includes a carbon gap seal providing a controlled leakage gap between an inner periphery of the carbon gap seal and an outer periphery of the carrier.

In another embodiment according to any of the previous embodiments, the fan drive turbine also drives a compressor, with the gear reduction placed between the compressor and the fan rotor.

In another embodiment according to any of the previous embodiments, the device to limit leakage includes piston ring seals.

In another embodiment according to any of the previous embodiments, the device to limit leakage includes a carbon gap seal providing a controlled leakage gap between an inner periphery of the carbon gap seal and an outer periphery of the carrier.

In another embodiment according to any of the previous embodiments, the transfer bearing is static.

These and other features may be best understood from the following drawings and specification.

DETAILED DESCRIPTION

Figure 1:
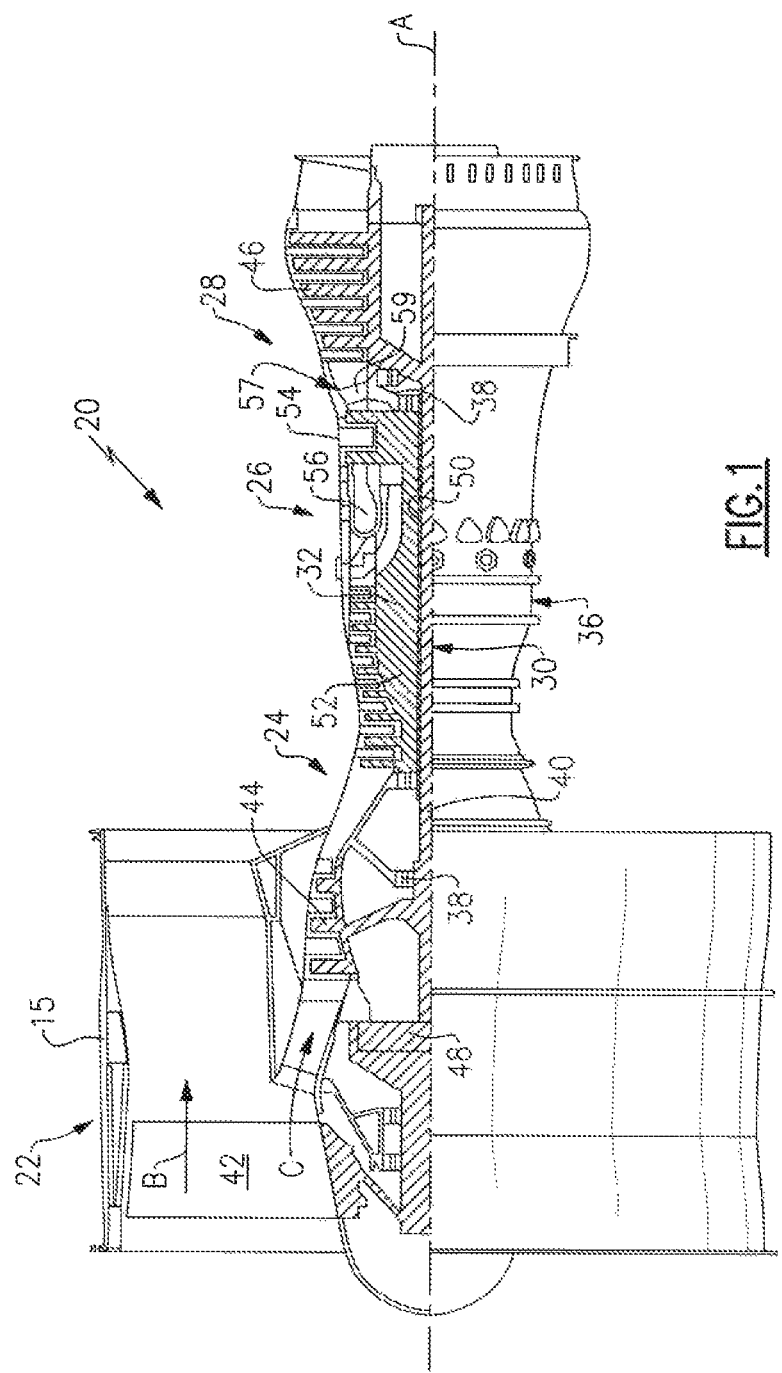
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second.

Figure 2:
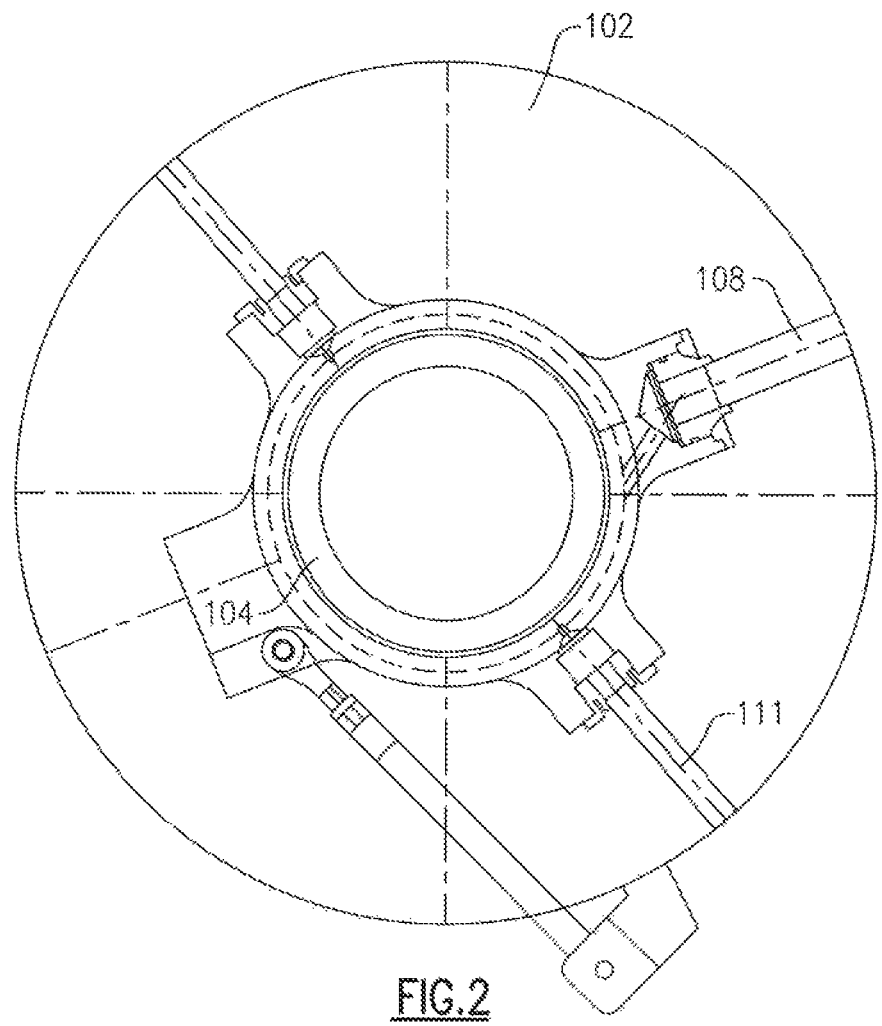
FIG. 2 shows a portion of a gear reduction.

FIG. 2 shows a carrier 104 which may be part of the gear reduction 48 of FIG. 1. The carrier 104 is driven to rotate and, in turn, will drive a fan drive shaft. This is shown schematically in FIG. 3 with fan rotor 132 being shown driven by the carrier 104.

Figure 3:
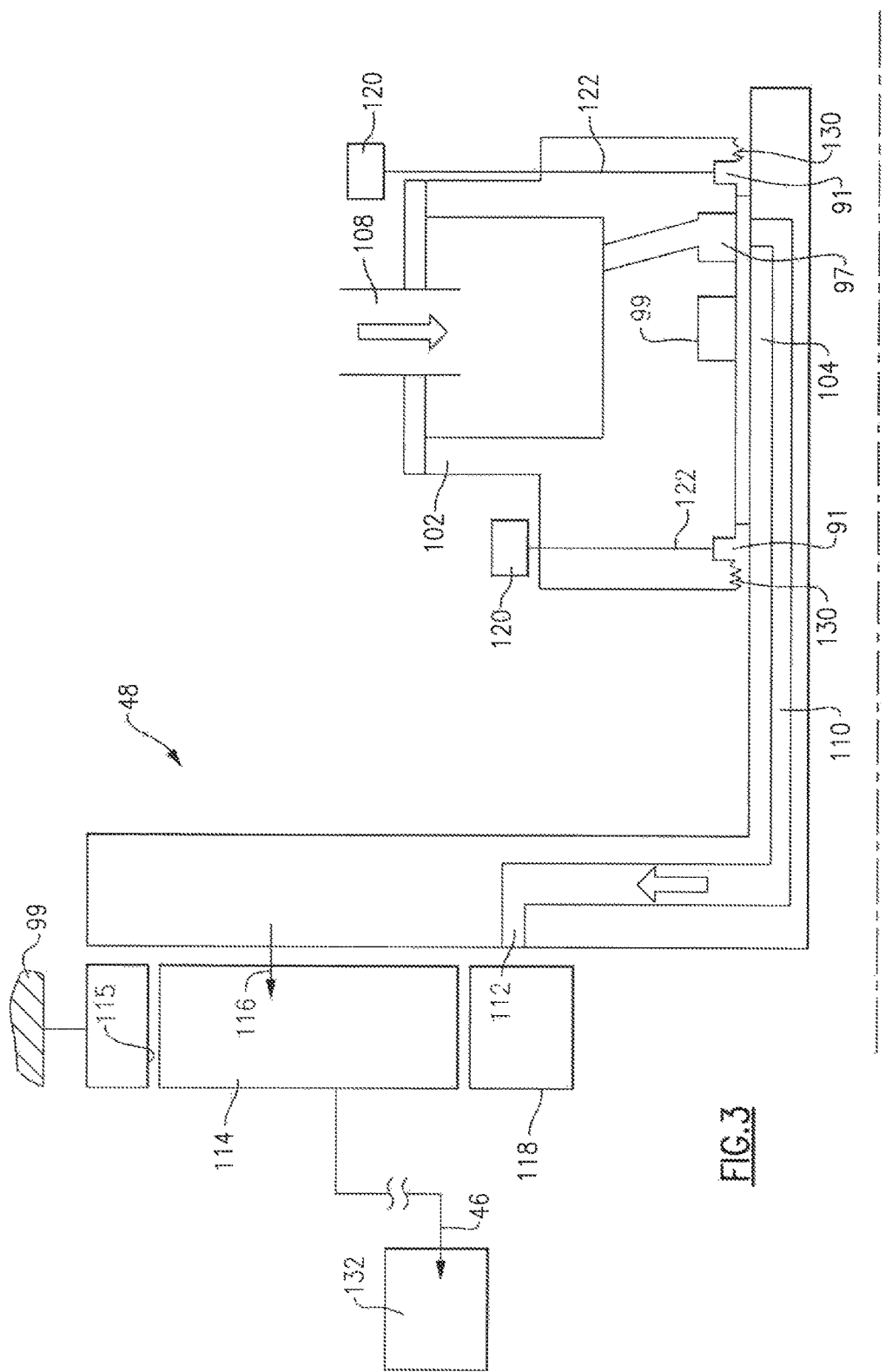
FIG. 3 is a schematic cross-sectional view.

As known, the carrier 104 is driven to rotate by gears 114 within a planetary transmission such as shown schematically in FIG. 3. Ring gear 115 reacts the torque from gears 114 to an engine static case 99.

As shown in FIG. 2, a transfer bearing 102 surrounds the carrier 104 and provides oil to various components in the gear reduction 48.

As an example, as shown in FIGS. 2 and 3, oil for journal bearings 118 is supplied at 108. Oil for gears 114 is shown being supplied at 111.

FIG. 3 schematically shows the oil 108 being delivered for the journal bearings 118 supporting gears 114 in the gear reduction 48. As shown, this oil passes into a chamber 97 and then a passage 110. The oil passes out of outlets 112 to lubricate journal bearings 118, which support gears 114. The gears 114 are shown schematically being supplied by oil from outlets 116. The outlets 116 are fed by other passages within the carrier 104 which are not illustrated. These passages are fed from supply 111 and chamber 99. A worker of ordinary skill in the art would recognize how to supply oil from the chamber 99 to the outlets 116 by having circumferentially secured passages through the carrier 104.

As known, a fan drive turbine, or the low pressure turbine in the FIG. 1 embodiment 46, drives the carrier 104. In this embodiment, the gears 114 may be planet gears. In addition, as known, there may be a flexible coupling between the two.

In this embodiment, an air supply 120 supplies air through passages 122 to chambers 91 at axial ends of the transfer bearing 102. The transfer bearing 102 does not actually support the carrier 104, but rather serves as an oil supply device and is static.

Figure 4:
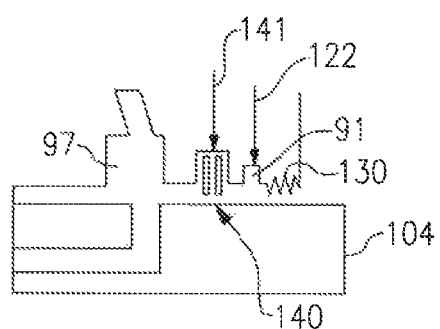
FIG. 4 is an alternative embodiment.

Also, labyrinth seals 130 are positioned between the air supply passage 122 and the ends of the transfer bearing 102. The air supply 120 and passages are 122 are designed and sized, along with the labyrinth seals 130, to control the amount of leakage oil from zero to a defined level to be used to lubricate additional features. FIG. 4 shows an alternative embodiment, where piston ring seals 141 leave a gap 140 allowing a controlled amount of leakage. The piston ring seals may be used alone or in conjunction with buffer air 122 and labyrinth seal 130.

Figure 5:
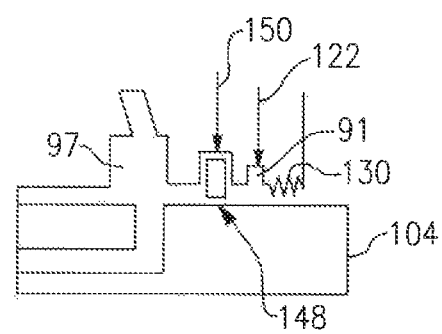
FIG. 5 is yet another alternative embodiment.

FIG. 5 shows a carbon gap seal 150, wherein a gap 148 with an outer periphery of the carrier 104 is controlled again to provide a controlled amount of leakage oil. The carbon seal may also be used with and without buffer air 122 and labyrinth seal 130.

Each of the three embodiments is designed such that the amount of oil leaking from the transfer bearing ends is controlled such that it can be used to lubricate additional features but yet is limited enough such that an undue amount of oil is not utilized.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gear reduction for a gas turbine engine comprising:
   a carrier driven to rotate with gears, said gears being supported by journal bearings;
   said carrier extending through a transfer bearing, said transfer bearing providing oil to passages within said carrier to supply oil to said gears and to said journal bearings;
   a device to limit leakage oil from said transfer bearing to axial ends of said transfer bearing to a controlled, non-zero, amount; and
   said device to limit leakage includes piston ring seals.

2. The gear reduction as set forth in claim 1, wherein said device to limit leakage oil includes a supply of pressurized air to said ends.

3. The gear reduction as set forth in claim 2, wherein said device to limit leakage oil includes a labyrinth seal at each axial end of said transfer bearing, with said pressurized air supplied on an opposed side of said labyrinth seal from said axial ends.

4. The gear reduction as set forth in claim 3, wherein said transfer bearing is static.

5. The gear reduction as set forth in claim 1, wherein said transfer bearing is static.

6. The gear reduction as set forth in claim 1, wherein said gears are planet gears.

7. A gear reduction for a gas turbine engine comprising:
   a carrier driven to rotate with gears, said gears being supported by journal bearings;
   said carrier extending through a transfer bearing, said transfer bearing providing oil to passages within said carrier to supply oil to said gears and to said journal bearings;
   a device to limit leakage oil from said transfer bearing to axial ends of said transfer bearing to a controlled, non-zero, amount; and
   said device to limit leakage includes a carbon gap seal providing a controlled leakage gap between an inner periphery of said carbon gap seal and an outer periphery of said carrier.

8. A gas turbine engine comprising:
   a fan drive turbine driving a fan rotor through a gear reduction;
   the gear reduction including a carrier driven to rotate with gears, said gears being supported by journal bearings; and
   said carrier extending through a transfer bearing, said transfer bearing providing oil to passages within said carrier to supply oil to said gears and to said journal bearings, and a device to limit leakage oil from said transfer bearing to axial ends of said transfer bearing to a controlled, non-zero, amount; and
   said device to limit leakage includes piston ring seals.

9. The gas turbine engine as set forth in claim 8, wherein said device to limit leakage oil includes a supply of pressurized air to said ends.

10. The gas turbine engine as set forth in claim 9, wherein said device to limit leakage oil includes a labyrinth seal at each axial end of said transfer bearing.

11. The gas turbine engine as set forth in claim 10, wherein said transfer bearing is static.

12. The gas turbine engine set forth in claim 9, wherein said device to limit leakage oil also includes piston ring seals.

13. The gas turbine engine as set forth in claim 8, wherein the fan drive turbine also driving a compressor, with said gear reduction being placed between said compressor and said fan rotor.

14. The gas turbine engine as set forth in claim 8, wherein said transfer bearing is static.

15. A gas turbine engine comprising:
   a fan drive turbine driving a fan rotor through a gear reduction;
   the gear reduction including a carrier driven to rotate with gears, said gears being supported by journal bearings;
   said carrier extending through a transfer bearing, said transfer bearing providing oil to passages within said carrier to supply oil to said gears and to said journal bearings, and a device to non-zero, amount; and
   said device to limit leakage includes a carbon gap seal providing a controlled leakage gap between an inner periphery of said carbon gap seal and an outer periphery of said carrier.

\* \* \* \* \*